United States Patent [19]

Hengelhaupt et al.

[11] 4,086,182

[45] Apr. 25, 1978

[54] RUST TRANSFORMING COMPOSITION

[75] Inventors: Erich Hengelhaupt; Lothar Peier, both of Bern, Switzerland

[73] Assignee: Noverox AG., Zug, Switzerland

[21] Appl. No.: 744,426

[22] Filed: Nov. 23, 1976

[30] Foreign Application Priority Data

Nov. 27, 1975 Switzerland .................. 15407/75

[51] Int. Cl.$^2$ .............................................. C23F 7/00
[52] U.S. Cl. ................................ 252/182; 106/14.13; 148/6.35; 252/389 R; 427/399
[58] Field of Search ............... 106/14, 304; 252/182, 252/389 R; 148/6.15, 6.35; 427/399, 388 R; 428/420

[56] References Cited

U.S. PATENT DOCUMENTS

| 3,537,915 | 11/1970 | Becker | 148/6.35 |
| 3,954,512 | 5/1976 | Kanter | 148/6.35 |
| 3,983,305 | 9/1976 | Peters et al. | 148/6.35 |
| 4,019,926 | 4/1977 | Lloyd et al. | 148/3.65 |

*Primary Examiner*—Benjamin R. Padgett
*Assistant Examiner*—Irwin Gluck
*Attorney, Agent, or Firm*—Larson, Taylor and Hinds

[57] ABSTRACT

A surface film of oxide on iron or steel is converted to a corrosion-resistant film by treatment with a composition comprising an aqueous dispersion or emulsion of a synthetic binding agent and a complexing agent for the iron which is a polymeric esterification product of an aromatic oxycarboxylic acid containing phenolic groups and a substance selected from the group consisting of acid anhydrides and substituted acid anhydrides. Advantageously the composition further comprises a solution of a synthetic plastics material.

16 Claims, No Drawings

RUST TRANSFORMING COMPOSITION

BACKGROUND OF THE INVENTION

The present invention relates to a rust transforming composition i.e. to a composition which can convert an oxide film on iron or steel into a corrosion-protective coating containing complexed compounds of iron in a synthetic binding agent.

The inventors have already proposed a rust transforming composition of this kind, in which the component capable of forming iron complex compounds comprises acids such as natural or synthetic aromatic oxycarboxylic acids having phenolic characteristics such as gallic acid or tannin. With this composition, a film of rust which is a mixture of iron oxides and of iron hydroxides can be converted into stable organic iron complexes which by preventing the continuous formation of new unstable iron hydroxide stop further rusting. The synthetic binding agent which is incorporated in the composition as an aqueous dispersion or emulsion forms a film which binds the organic iron complex compound and which is elastic and highly resistant to water, salt and weather.

SUMMARY OF THE INVENTION

It is an object of the invention to provide a further improved rust transforming composition. It is also an object of the invention to provide an improved method of converting an oxide film on a body composed of iron or steel into a corrosion-resistant protective coating.

In one aspect the invention provides a composition for converting a surface film of iron oxide on an iron body into a corrosion resistant film containing complexed compounds of iron, said composition comprising an aqueous dispersion or emulsion of a synthetic binding agent together with at least one polymeric esterification product of an aromatic oxycarboxylic acid having phenolic hydroxyl groups with a substance selected from the group consisting of acid anhydrides and substituted acid anhydrides.

In a further aspect the invention provides a method for converting a surface film of iron oxide on an iron or steel body to a corrosion-resistant protective coating which comprises applying to the surface of said body a composition comprising at least one polymeric esterification product of an oxycarboxylic acid having phenolic hydroxyl groups with a substance selected from the group consisting of acid anhydrides and substituted acid anhydrides, said polymeric esterification product being dissolved or dispersed in an aqueous dispersion or emulsion of a synthetic binding agent.

The oxycarboxylic acid derived polyesters employed comprise large, multidimensional molecules which, because of their free carboxyl and hydroxyl groups can react chemically with rust and make the iron oxides and iron hydroxides harmless. It is believed that first an intermolecular reduction of iron (III) hydroxide which is the main component of rust to iron (II) hydroxide takes place, after which formation of complex compounds takes place, the complexes then being converted by oxidation into stable iron (III) compounds. Whatever the mechanism the composition of the invention can passivate iron and can bring about a true transformation of rust into harmless complex iron compounds which together with the synthetic binding agent form a very stable contact coating on the iron or steel parts. The coating is not only physical adhered to the iron or steel but is directly linked chemically with the iron or steel and therefore assures that substantially all corrosive influences are eliminated.

DESCRIPTION OF THE PREFERRED EMBODIMENTS OF THE INVENTION

A condition for rapid chemical reaction of the oxycarboxylic acid derived polyester with rust is that the synthetic binding agent is dispersed or emulsified in water. However, it is known that the corrosion stability of protective films formed from aqueous dispersions of synthetic plastics material is insufficient because of the presence of emulsifiers and protective colloids which can partially re-emulsify the synthetic binding agent under the influence of humidity and of corrosive materials. This problem can be overcome according to a preferred embodiment of the invention by mixing the dispersion or emulsion of the synthetic binding agent with a synthetic plastics material which is in solution. The quantity of the solution of the synthetic plastics material present may be up to 50 weight % of the total content of plastics material or even more than that. The presence of the synthetic plastics material produces a significant increase of the corrosion stability of the resulting protective film.

The ratio of the quantities of the dispersed or emulsified synthetic binding agent to the synthetic plastics material is most preferably between 1.5 : 1 and 1 : 1.5. The dispersed or emulsified synthetic binding agent may, for example, be a styrene butadiene copolymer, a styrene butadiene acrylonitrile rubber, or a vinyltoluene butadiene resin. The synthetic plastics material which is employed as a solution may, for example, be a long or medium oil chain alkyd resin, polyvinyl chloride, a chlorinated rubber, an acrylate, a cyclic rubber, a styrene butadiene rubber or any other suitable synthetic rubber, or a styrene acrylate copolymer. The synthetic plastics material can be used in the form of a solution in an organic solvent, particularly an aromatic hydrocarbon such as benzene or xylol. It is also possible to use the same synthetic compound, for example a styrene butadiene copolymer, both as the dispersed or emulsified synthetic binding agent and as the synthetic plastics material. Furthermore, the solution of the synthetic plastics material may additionally contain corrosion protective oils such as fish oil, safflower oil or wood oil.

The oxycarboxylic acid with phenol characteristics from which the esterification product is formed may for example be natural gallic acid, tannin or synthetic organic oxycarboxylic acids with phenol characteristics, particularly a dioxy or trioxy carboxylic acid. These oxycarboxylic acids are preferably esterified with acid anhydrides such as maleic cid anhydride and phthalic acid anhydride or with substituted acid anhydrides such as styrene maleic acid anhydride or methyl vinyl ether maleic acid anhydride to give the desired esterification product. The reaction may be carried out by heating the reactants in an organic solvent such as acetone or ethylene glycol in the presence of an acid catalyst. After the reaction is complete the solvent can be evaporated off to give the desired polyester as a powder. Preferably, the polyester used is at least partially soluble in water. For example, good results can usually be achieved if the polyester is soluble in water-alcohol mixtures.

The rust protective composition of the invention preferably also contains a dioxybenzol derivative such as resorcinol or hydrochinone or a trioxybenzene, such as for example pyrogallol, which in association with the polyester, brings about a further improvement of the rust-resistant properties of the resulting protective film. Furthermore, the polyesters may be mixed with reactive compounds i.e. polar water-miscible organic solvents such as glycols or polyvalent alcohols to improve their water solubility or dispersibility. The pH of the composition is preferably adjusted to a value between 2.5 and 4.5, and especially about 3.5 by means of an organic or inorganic acid such as phosphoric acid, formic acid or p-toluene sulphonic acid. It has been found that the acid present catalyses the reaction between the rust and the complexing agent for the iron.

The invention will now be illustrated in the following Examples.

EXAMPLE 1

A polyester of a styrene-maleic acid copolymer containing gallic acid units was prepared by esterifying gallic acid which is a compound of formula

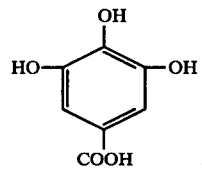

with a styrene maleic anhydride copolymer generally indicated by the formula:

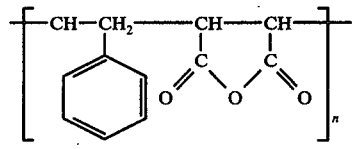

wherein the value of $n$ is about 25. The esterification was carried out by refluxing the styrene maleic anhydride copolymer and the gallic acid in a molar ratio of about 10 : 1 in acetone at 60° C for a period of about 1 hour using p-toluene sulphonic acid as catalyst. The product had a ratio of gallic acid units to maleic acid units of about 1.25 : 1 and was isolated as a powder after removal of the acetone.

A rust transforming composition was formed by mixing together the following ingredients:

|  | Weight % |
|---|---|
| Styrene - maleic acid - gallic acid copolymer prepared as described above (Powder) | 5 |
| Styrene - butadiene rubber dispersion - solids content 50% (containing 47% polymer and 3% monomer; see U.S. Pat. Application Serial No. 704081 (Lothar Peier et al) | 30 |
| Copolymer of styrene and an acrylate in solution in 50% white spirit (43.2% polymer; 1.8% monomer) | 25 |
| Water | 34.5 |
| Isopropanol | 5 |
| Formic Acid | 0.5 |

The styrene acrylate copolymer solution is emulsified into the styrene butadiene solution. By means of formic acid (which acts as a catalyst in the subsequent rust transformation), the product is adjusted to pH 3.5. Iron parts treated with the rust transforming composition prepared as described have the yellowish film of surface rust immediately transformed into a black corrosion-resistant coating containing complexed iron compounds in the synthetic binding agent.

EXAMPLE 2

A polyester is prepared by esterifying phthalic anhydride with gallic acid in ethylene glycol at about 100° C for a period of 1 hour using p-toluene sulphonic acid as catalyst to give a polymeric product containing phthalic acid anhydride units to gallic acid units in the ratio of about 1 : 1. Removal of the ethylene glycol gave the required polyester in the form of a powder.

The following ingredients are mixed together to give a rust transforming composition:

|  | Weight % |
|---|---|
| Polyester prepared as described above (powder) | 5 |
| Vinyltoluene butadiene resin dispersion containing 48 weight % polymer and 2 weight % monomer | 30 |
| Styrene acrylate copolymer in solution in heavy benezene 50% | 25 |
| Isopropanol | 5 |
| Water | 34.5 |
| Phosphoric acid | 0.5 |

The styrene acrylate copolymer solution is emulsified into the vinyltoluene butadiene resin dispersion. By means of the phosphoric acid (which acts as a catalyst for transforming the rust), the product is adjusted to a pH of 3. The resulting composition when applied to rusty iron parts converts the film of surface oxide into a black rubber-like corrosion protective coating.

EXAMPLE 3

A polyester of a poly (methylene vinyl ether) - maleic acid - gallic copolymer is prepared by esterifying gallic acid with a maleic anhydride - poly (methylene vinyl ether) copolymer generally indicated by the formula:

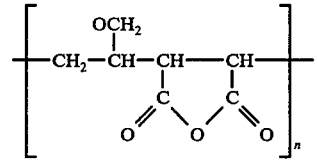

where $n$ is about 30. About 15 moles of gallic acid are employed per mole of the maleic anhydride - poly (methylene vinyl ether) copolymer. The esterification is carried out by refluxing the reactants in acetone at 60° C for about 1 hour using p-toluene sulphonic acid as catalyst and the resulting product is isolated as a powder after removal of the acetone and contains gallic acid units and maleic acid units in a molar ratio of about 1 : 1.

A rust transforming composition is formed by mixing together the following ingredients

|  | Weight % |
|---|---|
| Polyester prepared as described above (powder) | 5 |
| Styrene acrylate resin dispersion | 30 |
| Polymerisation product of vinyltoluene and an acrylate in 50 weight % solution in xylol | 25 |
| Isopropanol | 5 |
| Water | 34.5 |

-continued

| | Weight % |
|---|---|
| P-toluene sulphoric acid | 0.5 |

The vinyltoluene acrylate copolymer solution is emulsified into the styrene acrylate copolymer resin dispersion. By means of p-toluene sulphonic acid the pH of the product is adjusted to 2.5. The resulting rust transforming composition when applied to rusty iron parts forms a black corrosion-resistant protective coating.

EXAMPLE 4

The following ingredients are mixed together to give a rust transforming composition:

| | Weight % |
|---|---|
| Polyester of phthalic anhydride with gallic acid prepared as in Example 2 (powder) | 5 |
| Acrylate resin dispersion (50 weight % solids) | 30 |
| Vinyl acetate copolymer in 15% aqueous isopropanol | 25 |
| Resorcinol | 2 |
| Isopropanol | 4 |
| Water | 33.25 |
| Lactic acid | 0.75 |

The solution of the vinyl acetate copolymer is emulsified into the acrylate resin dispersion. By means of the lactic acid (which acts as a catalyst in the subsequent rust transformation) the pH of the product is adjusted to 4. The resulting rust transforming composition when applied to rusty iron parts converts the surface film of oxide into a rubber-like black corrosion-resistant coating.

EXAMPLE 5

The following ingredients are mixed together to give a rust transforming composition

| | Weight % |
|---|---|
| Styrene - maleic acid - gallic acid copolymer prepared as in Example 1 (powder) | 5 |
| Polyvinyl chloride dispersion (solids content 50 weight %; 48% polymer, 2% monomer) | 30 |
| Medium oil alkyd resin dissolved in lacquer benzine | 20 |
| Safflower oil | 5 |
| Hydrochinone | 2 |
| Isoproponol | 4 |
| Water | 33.25 |
| Acetic acid | 0.75 |

The alkyd resin solution is emulsified into the polyvinyl chloride dispersion. By means of acetic acid which acts as catalyst in the subsequent rust transformation, the pH of the product is adjusted to 4.5. On application of the resulting rust transforming composition to rusty iron parts the surface film of oxide is transformed to a stable complex compound of iron which is held within a deep black lacquerlike coating.

EXAMPLE 6

The following ingredients are mixed together to give a rust transforming composition

| | Weight % |
|---|---|
| Polyester of styrene - maleic acid -tannin (prepared as in Example 1 using tannin instead of gallic acid) | 5 |
| Terpolymer polyvinyl acetate disperson (50% by weight solids) | 30 |
| Chloride rubber dissolved in sangajol | 15 |
| Chinese wood oil | 10 |
| Pyrogallol | 2 |
| Isopropanol | 5 |
| Water | 33.25 |
| Metaphosphoric acid | 0.5 |

The chlorinated rubber solution is emulsified into the polyvinyl acetate dispersion. By mens of metaphosphoric acid which acts as catalyst in the subsequent rust transformation the pH of the product is adjusted to 3.2. The rust transforming composition on application to rusty iron converts the oxide film into a deep black lacquerlike corrosion-resistant coating.

We claim:

1. A composition for converting a surface film of iron oxide on an iron body into a corrosion resistant film containing complexed compounds of iron, said composition comprising an aqueous dispersion or emulsion of a synthetic binding agent together with at least one polymeric esterification product of an aromatic oxycarboxylic acid having phenolic hydroxyl groups with a substance selected from the group consisting of acid anhydrides and substituted acid anhydrides.

2. The composition of claim 1, further comprising a solution of a synthetic plastics material.

3. The composition of claim 2, wherein the ratio of the amounts of said synthetic binding agent and said synthetic plastics material present in said composition is from 1.5 : 1 to 1 : 1.5.

4. The compositon of claim 1, wherein said polymeric esterification product is at least partially soluble or dispersible in water.

5. The composition of claim 1, wherein said polymeric esterification product is an esterification product of said oxycarboxylic acid with maleic anhydride.

6. The composition of claim 1, wherein said polymeric esterification product is an esterification product of said oxycarboxylic acid with phthalic anhydride.

7. The composition of claim 1, wherein said polymeric esterification product is an esterification product of said oxycarboxylic acid with a styrene-maleic anhydride copolymer.

8. The composition of claim 1, wherein said polymeric esterification product is an esterification product of said oxycarboxylic acid with a methyl vinyl ether-maleic anhydride copolymer.

9. The composition of claim 1, wherein said polymeric esterification product is an esterification product of an oxycarboxylic acid selected from the group consisting of gallic acid and tannin with a substance selected from the group consisting of acid anhydrides and substituted acid anhydrides.

10. The composition of claim 1, further comprising a benzene derivative containing from 2 to 3 phenolic hydroxyl groups.

11. The composition of claim 3, wherein said synthetic plastics material is an acrylic resin.

12. The composition of claim 3, wherein the synthetic plastics material is in solution in an aromatic hydrocarbon.

13. The composition of claim 3, wherein the solution of the synthetic plastics material further comprises a corrosion protective oil.

14. The composition of claim 1, having a pH of from 2.5 to 4.5.

15. A method of converting a surface film of oxide on an iron or steel body to a corrosion-resistant protective coating which comprises applying to the surface of said body a composition comprising at least one polymeric esterification product of an oxycarboxylic acid having phenolic hydroxyl groups with a substance selected from the group consisting of acid anhydride and substituted acid anhydrides, said polymeric esterification product being dissolved or dispersed in an aqueous dispersion or emulsion of a synthetic binding agent.

16. The method of claim 15, wherein said composition applied to said surface additionally comprises a solution of a synthetic plastics material in a water-immiscible solvent, said solution being dispersed in said aqueous dispersion or emulsion of said synthetic binding agent.

* * * * *